United States Patent [19]

Van Teslaar

[11] 4,284,409
[45] Aug. 18, 1981

[54] REPLACEABLE PULLEY LAGGING

[75] Inventor: David A. Van Teslaar, Stockton, Calif.

[73] Assignee: Randtron, Menlo Park, Calif.

[21] Appl. No.: 69,804

[22] Filed: Aug. 27, 1979

[51] Int. Cl.³ .............................................. F16H 55/38
[52] U.S. Cl. ...................................... 474/185; 474/188
[58] Field of Search ................... 74/215, 216; 474/168, 474/177, 178, 170, 184, 185, 186, 188, 189, 190, 191, 192, 193, 194; 198/835

[56] References Cited

U.S. PATENT DOCUMENTS

| 507,467 | 10/1893 | Vautin . | |
|---|---|---|---|
| 662,046 | 11/1900 | Winter | 474/184 |
| 689,521 | 12/1901 | Titus | 474/185 |
| 1,170,755 | 2/1916 | Huddle | 474/185 |
| 1,252,847 | 1/1918 | Roberts . | |
| 1,434,239 | 10/1922 | Williams | 474/188 X |
| 1,469,828 | 10/1923 | Smith | 74/215 |
| 1,560,524 | 11/1925 | Avery . | |
| 1,636,492 | 7/1927 | Taylor | 474/190 X |
| 2,258,225 | 10/1941 | Shores | 74/216 X |
| 2,707,403 | 5/1955 | Thomson et al. . | |
| 3,010,332 | 11/1961 | Skates . | |
| 3,354,735 | 11/1967 | Holz . | |
| 3,789,682 | 2/1974 | Holz | 474/185 |

FOREIGN PATENT DOCUMENTS 977413  4/1951  France ....................................... 74/216

Primary Examiner—C. J. Husar
Assistant Examiner—Mark A. Daugherty
Attorney, Agent, or Firm—Roger B. Webster

[57] ABSTRACT

Replaceable pulley lagging—for an initially smooth-faced, endless conveyor or elevator belt drive pulley—comprising a multiplicity of relatively narrow, transversely extending traction pads pre-formed to mate with the arcuate pulley face, and applied edge to edge in a circumferential array and number to substantially fully embrace the face of the pulley; the traction pads being secured to the face of the pulley in detachable relation whereby to permit removal and replacement of said pads when worn or damaged.

3 Claims, 4 Drawing Figures

REPLACEABLE PULLEY LAGGING

BACKGROUND OF THE INVENTION

1. Field of the Invention

While replaceable pulley lagging is known, much of that which is commercially available is designed and adapted—with respect to structural form and manner of attachment—essentially for heavy-duty installations. The present invention was conceived in a successful effort to provide pulley lagging for light-duty installations where simplicity of structural form and ease of attachment are important considerations, and especially for those installations where—as in the food processing industry—the material carried on the pulley-driven belt does not pose a problem by reason of weight, abrasion, or the like.

2. The Prior Art

U.S. Pat. No. 3,354,735 is exemplary of the prior art known to applicant.

SUMMARY OF THE INVENTION

The present invention provides, as a major object, replaceable pulley lagging for an initially smooth-faced, endless conveyor or elevator belt drive pulley; the pulley lagging—especially designed for light-duty installations—comprising a multiplicity of relatively narrow, transversely extending traction pads pre-formed to mate with the arcuate pulley face, and applied edge to edge in a circumferential array and number to substantially fully embrace the face of the pulley; the traction pads being individually and directly secured to the face of the pulley by a simple yet novel arrangement whereby the traction pads are detachable to permit of quick and easy removal and replacement of said traction pads—individually—when worn or damaged.

The present invention provides, as another important object, detachable pulley lagging, as above, wherein each traction pad comprises a metallic back plate to which an elastomeric pad (as of rubber) is hot-vulcanized; the pad being of materially reduced thickness centrally of its sides and from end to end to define a continuous center-line groove bottomed by a relatively thin, initially unperforated, elastomeric membrane overlying and vulcanized to a corresponding portion of the back plate, and which strip is pre-punched to provide, beneath the membrane, a row of spaced holes; common fasteners (such as headed screws) being perforated through the membrane, pass through selected holes in the back plate strip, and thence are threaded into the pulley face in traction pad securing relation.

The present invention provides, as a further object, replaceable pulley lagging which is designed for ease and economy of manufacture, and ease of installation and removal.

The present invention provides, as a still further object, replaceable pulley lagging which is practical, reliable, and durable, and exceedingly effective for the purpose for which it is designed.

DESCRIPTION OF THE PREFERRED EMBODIMENT

Figure 1:
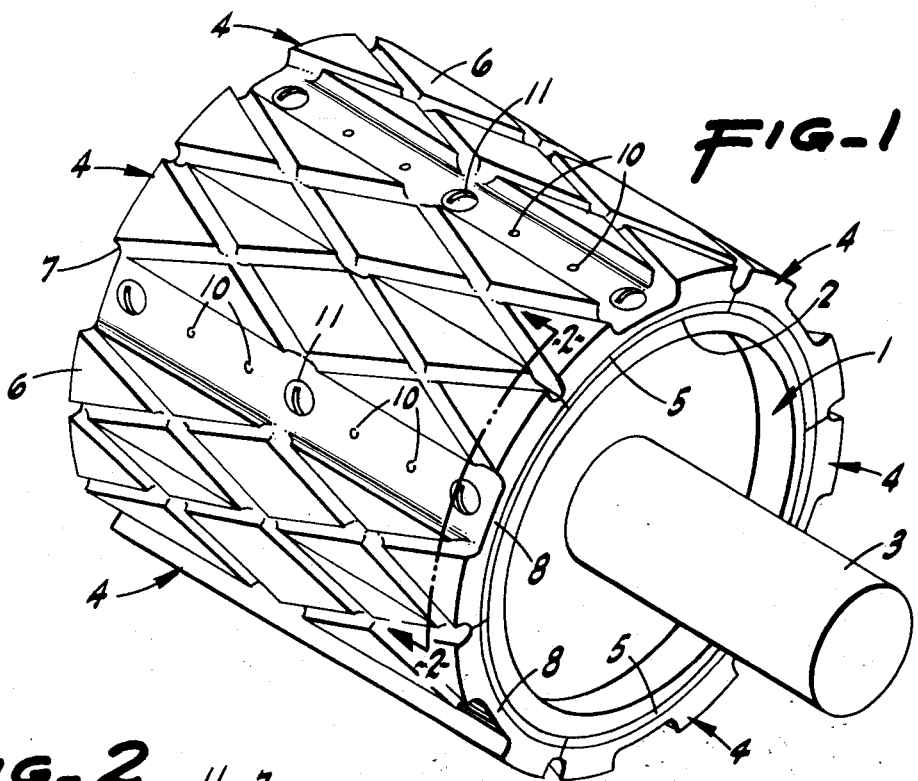
FIG. 1 is a perspective view of a pulley provided with the replaceable pulley lagging.
Figure 2:
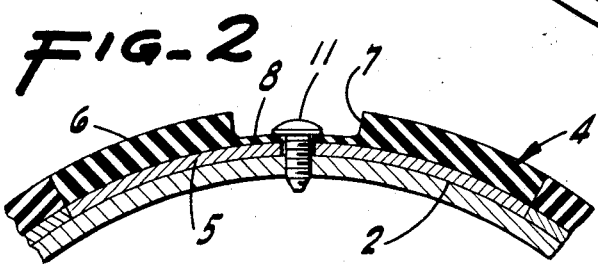
FIG. 2 is an enlarged, fragmentary, circumferential section taken substantially on line 2—2 of FIG. 1.
Figure 3:
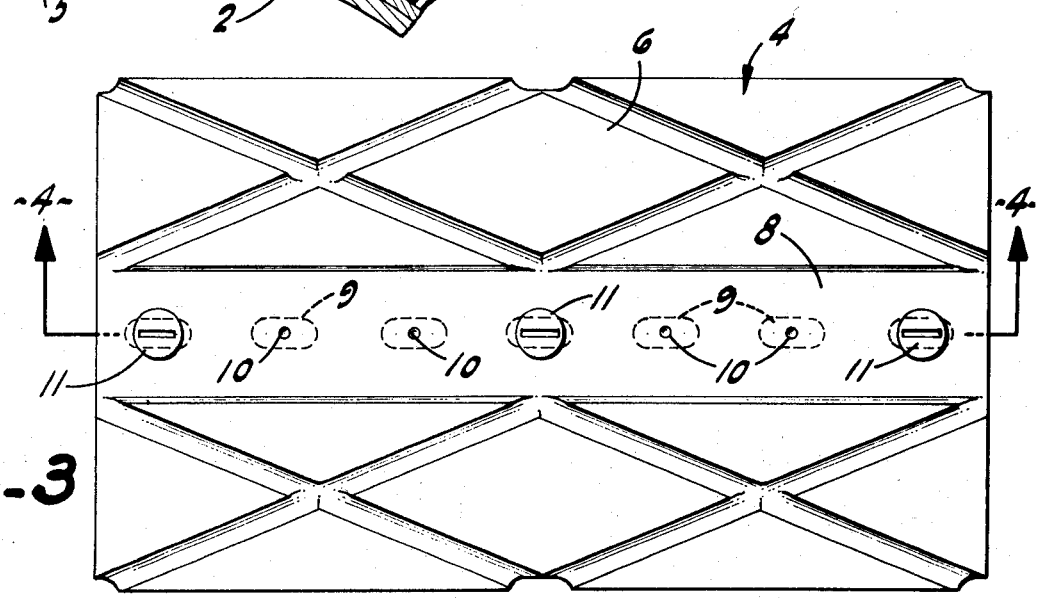
FIG. 3 is a plan view of one of the traction pads as secured in place.
Figure 4:
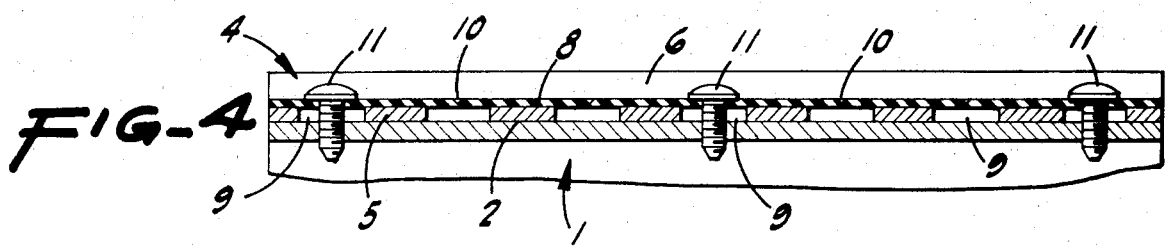
FIG. 4 is a transverse sectional elevation substantially on line 4—4 of FIG. 3.

Referring now more particularly to the drawings and to the characters of reference marked thereon, the replaceable pulley lagging, of the present invention, is adapted for use on an initially smooth-faced conveyor or elevator belt pulley, indicated generally at 1, and including a circumferentially arcuate face 2; the pulley, as usual, being supported and driven by an axial shaft 3.

The pulley lagging comprises a multiplicity of rectangular but elongated or relatively narrow, transversely extending traction pads—each indicated generally at 4—preformed to mate with the arcuate pulley face 2. The traction pads 4 are individually secured to the pulley face 2 in a number and circumferential array to substantially fully embrace or cover said pulley face; the securing being accomplished in a manner (as will hereinafter appear) which permits of quick and easy removal and replacement of said traction pads—individually—when worn or damaged.

Each traction pad 4 comprises a transverse metallic back plate 5 having an elastomeric (as of rubber) pad 6 hot-vulcanized, in matching relation, to the face of such back plate; the outer surface of such pad 6 being either tractionpatterned (as shown) or smooth as intended use or working conditions may dictate.

The transverse back plate 5 of each traction pad 4 is arcuately configured, from side to side (i.e., circumferentially of the pulley 1), to mate with the face 2 of said pulley, and each such traction pad is secured to the pulley face in the following manner:

Each elastomeric pad is materially reduced in thickness centrally of its sides and from end to end whereby to define a continuous center-line groove 7 of substantial depth and bottomed by a relatively thin, initially unperforated, elastomeric membrane 8.

The portion of the back plate 5 beneath the membrane 8, and to which the membrane is vulcanized, is pre-punched to provide a row of spaced holes 9, with the row extending substantially from end to end of said portion of the back plate. The outer surface of the membrane 8 is formed—centrally of each hole 9—with an indent or dimple 10 which serves as a visual indicator of the position of the hole 9 therebeneath.

Each traction pad 4 is secured in place, on the pulley face 2, by means of a plurality of fasteners, such as headed screws 11, which are perforated through the membrane 8, pass through selected holes 9 (located by the dimples 10) in the portion of the back plate beneath said membrane, and thence are threaded into the pulley face in traction pad securing relation.

With each traction pad 4 constructed, and secured, in the manner above described, the individual traction pads—in addition to ready initial installation on a pulley—can be quickly and easily removed and replaced when necessary; all as is especially desirable in light-duty, endless conveyor installations, as in the food processing industry and similar adaptations.

The advantage of the membrane 8, which overlies the corresponding portion of the back plate 5 and the unused holes 9, resides—especially in the food processing industry—in the fact that material (food) build-up is minimized and cleaning can be more readily undertaken.

From the foregoing description, it will be readily seen that there has been produced such a replaceable pulley lagging as substantially fulfills the objects of the invention, as set forth herein.

While this specification sets forth in detail the present and preferred construction of the replaceable pulley lagging, still in practice such deviations from such detail may be resorted to as do not form a departure from the spirit of the invention as defined by the appended claims.

I claim:

1. In replaceable pulley lagging which includes a multiplicity of elongated traction pads extending, in circumferential array, across and detachably secured to the face of a pulley; the improvement characterized by each traction pad comprising a back plate, an elastomeric pad vulcanized on the back plate, the elastomeric pad being of materially reduced thickness intermediate its sides to form a lengthwise groove of substantial depth, there being spaced holes in the portion of the back plate beneath the groove, and fasteners passing from the groove through the holes in the back plate and detachably securing the same to the face of the pulley; each traction pad being preformed to mate with the arcuate pulley face, and the lengthwise groove is disposed centrally of the sides of the elastomeric pad, is continuous, and extends from end to end of said pad; there being a membrane, integral with the elastomeric pad, and which membrane bottoms the groove and is vulcanized to said portion of the back plate.

2. An improvement, in replaceable pulley lagging, as in claim 1, in which the fasteners comprise headed screws which are perforated through the membrane.

3. In replaceable pulley lagging which includes a multiplicity of elongated traction pads extending, in circumferential array, across and detachably secured to the face of a pulley; the improvement characterized by each traction pad comprising a back plate, an elastomeric pad vulcanized on the back plate, the elastomeric pad being of materially reduced thickness intermediate its sides to form a lengthwise groove of substantial depth, there being spaced holes in the portion of the back plate beneath the groove, and fasteners passing from the groove through the holes in the back plate and detachably securing the same to the face of the pulley; each traction pad including a membrane, integral with the elastomeric pad, which bottoms the groove and overlies and is vulcanized to said portion of the back plate; the fasteners being perforated through the membrane above related holes, and the membrane being formed, in its upper surface, with a fastener locating dimple positioned above each hole.

* * * * *